United States Patent Office 3,450,060
Patented June 17, 1969

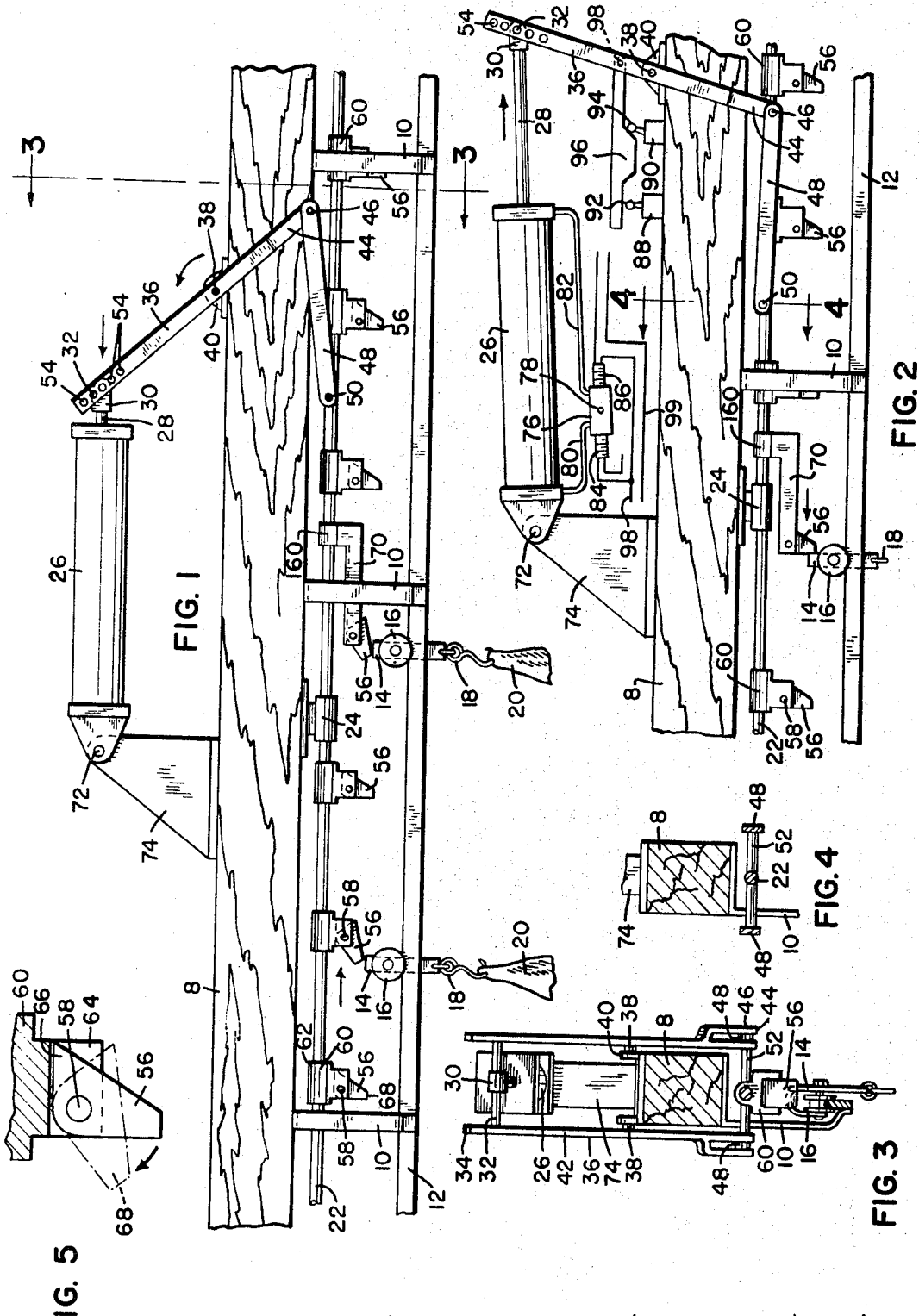

3,450,060
TROLLEY SPACING DEVICE
Lowell K. Adams, Rte. 2, Box 136, Greeley, Colo. 80631, and Albert D. Davis, 1614 Banner, Schuyler, Nebr. 68661
Filed Aug. 10, 1966, Ser. No. 571,564
Int. Cl. B61k 7/02; E01b 25/22
U.S. Cl. 104—250
7 Claims

ABSTRACT OF THE DISCLOSURE

A trolley spacing device for handling heavy loads, incorporates an overhead trolley rail suspended from a stationary support, which same support suspends a reciprocative beam adjustable as to stroke, a motor mounted on a stationary support reciprocates the beam and includes piston operated lever arms and links which are pivotally connected to the piston and beam respectively. The beam carries a succession of selectively spaced pivoted fingers. The fingers normally depend into the path of travel of a succession of trolleys, and advances the trolleys and their loads in one direction along the overhead rail. The reciprocative beam, due to the heavy weight of the loads requiring advancement, is journaled in one or more sturdy bearings likely to interfere with advancement of one or more trolley-advancing fingers, and to prevent such interference the beam is provided with an extension means ensuring unobstructed movement of a finger past the beam-supporting bearing.

---

The present invention relates to a trolley spacing device, the purpose of which is to advance and arrange uniformly upon a conveyor rail, article-suspending trolleys that are fed to the spacing device without regard to uniformity of spacing occurring between successive article-suspending trolleys. While the device of the invention is suitable for other applications, it is disclosed herein by way of example, as an apparatus for uniformly spacing and advancing animal carcasses in meat dressing plants or the like, at locations or stations where uniform spacing of the carcasses upon conveyor rails is helpful or necessary to economical operation of the processing plant.

An object of the invention is to provide a simple, accurate, and durable apparatus for uniformly spacing and advancing articles successively upon a conveyor rail, the articles having been fed to said apparatus without regard to uniformity of spacing.

Another object of the invention is to provide apparatus for the purpose stated, which is so constructed that it may be applied with ease and dispatch to existing conveyor equipment in a meat processing plant.

A further object of the invention is to provide apparatus of the character stated, which is constructed to operate with a high degree of dependability, free of maintenance servicing, so as to offer no interference with continuity of processing plant operation.

Another object is to provide a device of the character stated, which employs as a major element of its structure, a reciprocative beam carrying a succession of drop fingers for properly engaging, spacing, and advancing a succession of article-suspending trolleys economically, effectively, and with such precision as to ensure a high degree of continuity in the meat handling procedure.

The foregoing and other objects are attained by the means described herein and illustrated upon the accompanying drawing, in which:

FIG. 1 is a fragmentary side elevational view of a track or rail system embodying the means of the present invention, the reciprocative beam being shown retracted.

FIG. 2 is a view similar to FIG. 1, with the reciprocative beam in partially advanced position.
FIG. 3 is a cross-section taken on line 3—3 of FIG. 2.
FIG. 4 is a cross-section taken on line 4—4 of FIG. 1.
FIG. 5 is a cross-section detailing a drop finger.

In FIGS. 1 and 2 is shown a timber 8 or other suitable supporting structure, from which is suspended a multiplicity of rigid track hangers 10 arranged to support a trolley rail or track 12. The track may extend a substantial distance throughout a building, and will ordinarily support a multiplicity of wheeled trolleys 14 movable individually along the length of the track with the aid of rollers 16 which ride upon the upper edge of the track or rail. The hangers 10 may be offset from the track, as in FIG. 4, so as to permit the trolleys to pass the hangers as the trolleys advance along the track. Each trolley may carry a hook 18 or similar device for suspending articles 20 to be conveyed, such articles being herein shown as animal carcasses.

Under ordinary conditions, trolleys carrying carcasses will accumulate at the right-hand end of the track shown in FIGS. 1 and 2, with the carcasses abutting one another. Such carcasses are to be separated from one another in succession, to facilitate further processing, and such is the purpose and function of the apparatus herein disclosed. The appartus performs to space and advance the carcasses to the left along track 12, with uniformity of spacing between successive carcasses.

The apparatus may comprise a long rod 22 slidably supported in bearing members 24 which are fixed to support 8 at regular intervals. The rod is reciprocable a predetermined distance through the bearing members, in opposite directions, and may therefore be referred to as a reciprocative beam. Reciprocation of the beam or rod 22 may be effected by a fluid motor 26 which is actuated pneumatically or hydraulicaly to extend and retract its piston rod 28, in alternation. The crosshead 30 of piston rod 28 may be pivoted at 32 upon the upper end portion 34 of a lever arm 36, which intermediate its ends has a pivotal mounting at 38 upon a bracket 40 fixed relative to support 8. Lever arm 36 may comprise two spaced parallel members 42, 42, as best shown in FIG. 3.

At its lower end 44, lever arm 36 carries a pivot pin 46 making connection with one end of a pitman 48, the opposite end of which pitman has pivotal connection at 50 with a cross-bar 52, said cross-bar 52 being welded or otherwise fixed to beam 22 transversely thereof. As FIG. 4 indicates, pitman 48 may be duplicated at the lower ends of the members 42, 42 constituting lever arm 36, thereby to provide a balanced structure.

From the foregoing, it will be understood that outward projection of piston rod 28 will serve to rotate lever arm 36 in clockwise direction about its pivot 38 (FIG. 2), thereby causing pitman 48 to bodily shift beam 22 a predetermined distance to the left. Conversely, according to FIG. 1, retraction of piston rod 28 effects a bodily shifting of the beam a predetermined distance to the right. The longitudinal travel of beam 22 may be varied, if desired, by engaging pivot 32 with any one of several holes 54 provided in the upper end portion of lever arm 36. In the operation of the device, operating fluid is admitted alternately to opposite ends of fluid motor cylinder 26, for imparting to the beam a reciprocatory motion first in one direction and then in the opposite direction, preferably with measured regularity.

At regularly spaced intervals along the length of beam 22, there is located a succession of propulsion devices or drop fingers 56. Fingers 56 are each pivoted as at 58 upon a carrier 60, the carriers being fixed upon beam 22 in any suitable manner, as by means of set screws or equivalent fasteners permitting fixation of the carriers upon said beam. Each carrier may include a sleeve-like head 62 accommodating the beam, and a pair of depending spaced arms 64 between which the drop finger may swing freely upon its pivot 58. The drop finger may be provided with a heel or abutment 66 to strike the body 60, as shown in full lines, FIG. 5, for the purpose of limiting rotation of the finger in counter-clockwise direction. In the opposite direction of rotation, finger 56 may move to the displaced position shown by broken lines in FIG. 5, at which the nose end 68 thereof is elevated as shown. The nose end 68 may be heavier than heel 66, and will therefore normally assume the operative or extended position indicated by full lines in FIG. 5.

By referring to FIG. 1, it will be apparent that shifting of beam 22 to the right, may cause drop finger 56 to override a trolley 14, by displacement of the finger to the elevated or inoperative position. However, upon a subsequent shifting of the beam to the left (FIG. 2), the drop finger 56 will be rigidified by action of its heel 66, to firmly engage a trolley and therefore effect an advancement of the trolley with the beam. Thus, the trolley with its suspended carcass will be propelled along track or rail 12 a distance approximating the forward stroke of the beam.

Due to the presence of the stationary bearings 24 at uniform distances apart along the length of beam 22, provision is made for preventing interference with the beam advancement by that drop finger carrier which approaches the bearing as the beam advances. For this purpose, the drop finger which so approaches the bearing, is to be supported upon a forward extension 70, FIGS. 1 and 2. The extension is lowered relative to bearing element 24, so as to pass beneath it as the beam moves to advance a trolley, this being clearly illustrated by FIG. 2. The drop finger 56 associated with extension 70, is constructed and arranged in the same manner as was explained in the treatment of FIG. 5, to provide for pivotal limitations of the drop finger as the beam advances and retracts. The drop finger carried by extension 70 is to be equally spaced from those drop fingers which precede and follow it with respect to position upon the beam. At no time will the carrier 160 of extension 70 strike the bearing 24.

The base end of fluid motor 26 may be pivoted as at 72 upon a standard 74 affixed to support 8. The beam 22, of course, moves in spaced parallelism with rail or track 12, at a proper distance to enable drop fingers 56 to engage the trolleys as previously explained. In a preferred construction of the apparatus, the drop finger carriers 60 and 160 may be individually adjustable along the length of the beam, and the beam itself may be variable as to the length of stroke required under differing service or operating conditions.

The apparatus herein disclosed may be employed wherever the orderly spacing of trolleys or products may be considered advantageous or desirable, as for example, in the distribution or sorting of products, or in presenting the products for convenient handling, treatment, or inspection.

The means for admitting operating fluid alternately to opposite ends of fluid motor cylinder 26, may be conventional of design. As herein suggested by way of example, 76 denotes a fluid control valve having a fluid inlet port 78, and fluid distribution outlet pipes 80 and 82 connected to opposite ends of the cylinder. The valve may be actuated by means of solenoids 84 and 86, operative in alternation to direct pressurized fluid from inlet port 78 to either of the pipes 80, 82.

The reference characters 88 and 90 indicate electric switches or contactors having movable actuators 92 and 94 to be struck and moved by a reciprocative cam 96, the cam having connection as at 98 with a movable part of the apparatus, for example the lever arm 36. As the lever arm rocks about its pivot 38, cam 96 will displace alternately the switch actuators 92 and 94 for closing the electrical circuits through solenoids 84 or 86, to actuate valve 76. The conductors 98 and 99 are line wires supplying electric current to the solenoids and the switches 88, 90. Simple and conventional circuitry may be employed for electrically connecting the solenoids and the switches with line wires 98 and 99, to energize the solenoids in alternation as cam 96 moves to and fro with lever arm 36 to actuate the switches 88, 90 alternately.

As should really be evident, switches 88 and 90 might be located near rod or beam 22, to be actuated by a cam such as 96 having a direct connection with said rod or beam. Also, in a slightly modified construction, piston rod 28 might be so located as to operate directly upon rod or beam 22, without the intervention of a lever arm such as 36.

It is to be understood that various modifications and changes may be made in the structural details of the apparatus, within the scope of the appended claims, without departing from the spirit of the invention.

What is claimed is:

1. Apparatus for advancing and spacing trolleys along a substantially horizontal track, supported from a stationary support, which track includes an accumulative section onto which trolleys are fed, and supported without regard to uniformity of spacing, said apparatus comprising: an elongate reciprocable beam supported from said stationary support and above the track in spaced substantial parallelism with the track and the aforesaid accumulative section thereof; motor means mounted on said stationary support and operative to reciprocate the beam lengthwise between an advanced position and a retracted position; said motor means comprising a piston operated pair of lever arms and links pivotally connected to said piston and beam respectively and means for varying the effective length of the lever arms to vary the length of the stroke of the beam, and propulsion means located at variable spaced intervals along the beam for engaging successive trolleys and moving said trolleys along the rail only upon movement of the beam toward the advanced position, said propulsion means being ineffective to move the trolleys in the direction of retraction of the beam; said propulsion means including carriers on said beam and a plurality of drop fingers pivoted upon the carriers for movement between an operative position and a displaced inoperative position, and means for rigidifying the drop fingers to effect movement of the rolleys along the rail when said fingers strike the trolleys during movement of the beam toward advanced position, said fingers being displaceable to override the trolleys as the beam moves toward th e retracted position; a stationary bearing supporting the beam for reciprocation; and extension means pivotally supporting a bearing-adjacent drop finger upon the beam, for movement of the last-mentioned drop finger past the bearing during reciprocation of the beam between the advanced and retracted positions of said beam.

2. Apparatus as specified by claim 1, wherein the extension means comprises an arm fixedly mounted upon the beam to extend in spaced substantial parallelism with said beam, said arm having a free end portion supporting the mounting pivot of said bearing-adjacent drop finger.

3. Apparatus as specified by claim 2, wherein is included means for adjusting the arm longitudinally along the beam.

4. In combination, a substantially horizontal track and means rigidly suspending said track from a stationary overhead support; a multiplicity of trolleys movable individually along the track, said track having an accumulative section onto which the trolleys are fed, and supported without regard to uniformity of spacing of the trolleys; and elongate reciprocable beam, and bearing means on the stationary support slidably supporting said beam in spaced substantial parallelism with the track and the aforesaid accumulative section thereof; means including a motor for reciprocating the beam between advanced and retracted positions; a plurality of carriers mounted in spaced relation upon the beam, said carriers each having a transverse pivot associated therewith; a finger mounted for swinging movement upon each carrier pivot, into and out of the path of travel of the trolleys upon the track; said fingers being displaceable out of the path of travel of the trolleys by contact with the trolleys incident to each retraction of the beam; and cooperative means on each finger and its associated carrier, for maintaining the finger in the path of travel of the trolleys, when the finger advances into contact with a trolley incident to movement of the beam toward the advanced position of said beam, one of said carriers comprising a head adjustably fixed upon the reciprocable beam; and a forward extension on said head having a free end spaced from the beam a distance exceeding the distance which the bearing means depends beneath said beam whereby said free end of the extension may pass freely under and beyond said bearing means with each advancing movement of the beam; a finger mounted for swinging movement upon the free end of said extension into and out of the path of travel of the trolleys upon the track; means for maintaining the last mentioned finger within the path of trolley travel so long as said last mentioned finger advances in contact with a trolley moving toward an advanced position of the beam, said last mentioned finger being displaceable out of the path of travel of the trolleys by contact with the trolleys incident to each retraction of the reciprocable beam.

5. The combination as specified by claim 4, wherein is included means for varying the stroke of the beam movements.

6. The combination as specified by claim 4, wherein is included means for altering the sepacing of the fingers upon the beam.

7. The combination as specified by claim 4, wherein is included means for varying the stroke of the beam movements; and means for altering the spacing of the fingers upon the beam.

References Cited

UNITED STATES PATENTS

| | | | |
|---|---|---|---|
| 3,208,401 | 9/1965 | Freeman | 104—162 |
| 2,583,968 | 1/1952 | Rosseau | 104—162 |
| 2,624,440 | 1/1953 | Hornberger | 104—162 |
| 2,988,014 | 6/1961 | Pianowski | 104—162 |
| 3,149,581 | 9/1964 | Davis | 104—162 |
| 3,196,808 | 7/1965 | Senn | 104—173 |
| 3,219,205 | 11/1965 | Grant | 104—162 XR |

ARTHUR L. LA POINT, *Primary Examiner.*

C. B. LYON, *Assistant Examiner.*

U.S. Cl. X.R.

104—89, 162